United States Patent [19]
Nakamura

[11] Patent Number: 5,257,686
[45] Date of Patent: Nov. 2, 1993

[54] VISCOUS FLUID COUPLING DEVICE

[75] Inventor: Ryuji Nakamura, Toyota, Japan

[73] Assignee: Aisin Seiki Kabushiki Kaisha, Kariya, Japan

[21] Appl. No.: 913,705

[22] Filed: Jul. 16, 1992

[30] Foreign Application Priority Data

Jul. 18, 1991 [JP] Japan .................. 3-178479

[51] Int. Cl.⁵ .............. F16D 35/00; F16D 43/25
[52] U.S. Cl. ................ 192/58 B; 192/82 T; 192/104 F
[58] Field of Search .............. 192/58 B, 82 T, 104 F

[56] References Cited

U.S. PATENT DOCUMENTS

| | | | |
|---|---|---|---|
| 3,170,552 | 2/1965 | Mitchell | 192/58 B |
| 3,642,105 | 2/1972 | Kikuchi | 192/58 B |
| 3,690,428 | 9/1972 | La Flame | 192/58 B |
| 3,840,101 | 10/1974 | Peter et al. | 192/58 B |
| 3,990,556 | 11/1976 | Hayashi et al. | 192/58 B |
| 4,238,020 | 12/1980 | Nerstad et al. | 192/104 F |
| 4,298,111 | 11/1981 | Hayashi | 192/58 B |
| 4,544,053 | 10/1985 | Yamaguchi et al. | 192/82 T |
| 4,570,771 | 2/1986 | Yamaguchi et al. | 192/58 B |
| 5,070,981 | 12/1991 | Todo | 192/58 B |
| 5,109,965 | 5/1992 | Inoue | 192/58 B |

FOREIGN PATENT DOCUMENTS

| | | | |
|---|---|---|---|
| 59-28778 | 7/1984 | Japan. | |
| 0127522 | 6/1987 | Japan | 192/58 B |

Primary Examiner—Rodney H. Bonck
Attorney, Agent, or Firm—Oblon, Spivak, McClelland, Maier & Neustadt

[57] ABSTRACT

A viscous fluid coupling device is comprised of (1) an input member, (2) a rotor secured to the input member, (3) an output member having therein an inner space and mounted rotatably on the input member, (4) a partition plate, for dividing the inner space into an operating chamber and a reservoir chamber for storing therein an amount of viscous fluid, secured to the output member and having a passage for establishing a fluid communication therebetween, (5) a thermal response valve, for opening and closing the passage, provided on the output member, (6) a labyrinth, for transmitting the rotation torque from the input member to the output member via the viscous fluid, provided therebetween so as to be positioned in the operating chamber, (7) a pump device, for returning the viscous fluid to the reservoir chamber, formed between an outer periphery of the rotor and an inner surface of the output member, and (8) a bypass device, for the direct supply of the viscous fluid supplied from the reservoir chamber to the pump device upon high speed rotation of input member, positioned in the rotor in parallel with the labyrinth.

2 Claims, 4 Drawing Sheets

VISCOUS FLUID COUPLING DEVICE

BACKGROUND OF THE INVENTION

The present invention relates to a viscous fluid coupling device, and in particular to a viscous fluid coupling device which is used to establish a connection between an output shaft of a vehicle engine and a cooling fan assembly.

A conventional viscous fluid coupling device of the kind is disclosed in Japanese Patent Publication No.-Sho59(1984)-28778 which was issued on Jul. 16, 1984. This conventional device has an input member to be driven by a vehicle engine, an output member rotatably mounted on the input member via bearing, a fan assembly connected to the output member, a rotor with a passage secured to the input member and accommodated in a space defined between the input member and the output member, and a labyrinth mechanism provided on an outer periphery of the rotor. The space is divided into an operating chamber and a reservoir chamber by a partition plate with a hole. The partition plate is provided with a thermally responsive or first valve in order that the hole can establish a fluid communication between the reservoir chamber and the operating chamber while an environment temperature is above a set value. A second valve is provided with on the rotor which is set to close the passage when the rotation number of the input member exceeds a set value. An amount of viscous fluid in the space is set to be circulated through the reservoir chamber, the hole, the passage, and the labyrinth mechanism. The rotation number of the output member is set to depend on the quantity of the viscous fluid to be supplied to the labyrinth mechanism which is related to the conditions of the first valve and the second valve.

In case that the foregoing viscous fluid coupling device is in operation under a hot environment, the first valve is being opened, when the centrifugal force exceeds the set value as a result of a high speed rotation of the input member, the second valve is closed, which results in that the increase of the rotation number of the output member is restricted despite any further increase of the rotation number of the input member.

However, when the second valve is brought into opened condition again when the rotation number of the input member becomes less than the set value concurrent with the lowering in the temperature, both of the first valve and the second valve are fully opened, resulting in that the large amount of viscous fluid is supplied to the the labyrinth mechanism. Thus, the rotational number of the output member is increased despite of the cold environment under which the high rotation of the fan assembly by the output member is not required.

SUMMARY OF THE INVENTION

It is, therefore, a primary object of the present invention to provide a viscous fluid coupling device without the foregoing drawback.

It is another object of the present invention to provide a viscous fluid coupling device wherein a restriction control of an output member can be established correctly regardless of temperature environment.

In order to attain the foregoing objects, a viscous fluid coupling device is comprised of (1) an input member, (2) a rotor secured to the input member, (3) an output member having therein an inner space and mounted rotatably on the input member, (4) a partition plate, for dividing the inner space into an operating chamber and a reservoir chamber for storing therein an amount of viscous fluid, secured to the output member and having a passage for establishing a fluid communication therebetween, (5) a thermal, response valve, for opening and closing the passage, provided on the output member, (6) a labyrinth, for transmitting the rotation torque from the input member to the output member via the viscous fluid, provided therebetween so as to be positioned in the operating chamber, (7) a pump device, for returning the viscous fluid to the reservoir chamber, formed between an outer periphery of the rotor and an inner surface of the output member, and (8) a bypass device, for the direct supply of the viscous fluid supplied from the reservoir chamber to the pump device upon high speed rotation of input member, positioned in the rotor in parallel with the labyrinth.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

Embodiments of the present invention will be described hereinunder in detail with reference to the accompanying drawings.

Figure 1:
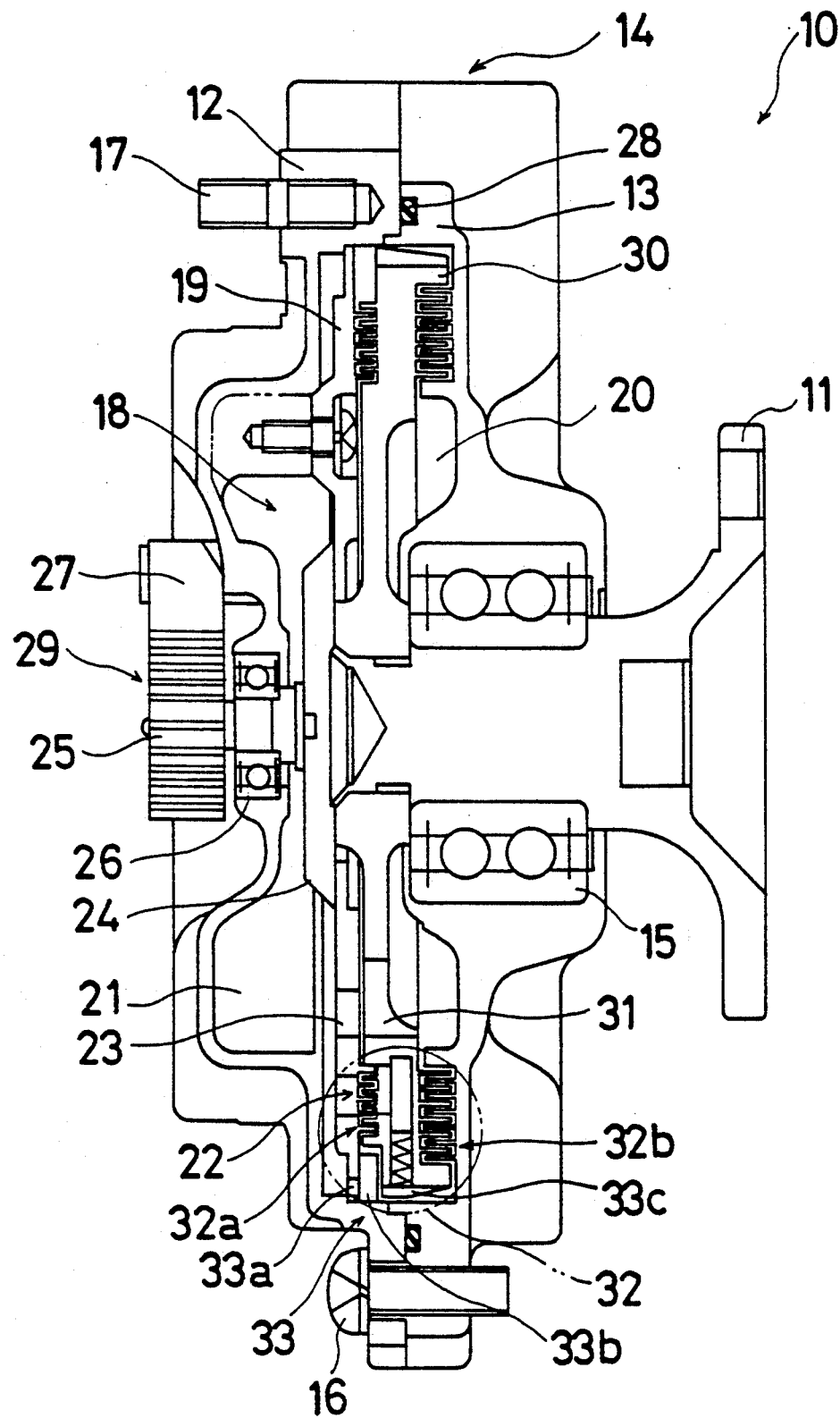
FIG. 1 is a cross-sectional view of one embodiment of a viscous fluid coupling device according to the present invention.

Referring first to FIG. 1, a viscous fluid coupling device 10 has an input member or a driven shaft 11 which is set to be driven by a vehicle engine (not shown), and an output member 14 including a cover 12 and a casing 13 which is rotatably mounted on the input member 11 via a bearing 12. The cover 12 and the casing 13 are connected with each other by a plurality of bolts 16 (only one is shown). A cooling fan assembly (not shown) is attached to the cover 12 by a plurality of bolts 17 (only one is shown). A sealing member 28, which is in the form of an annular shape, is disposed between the cover 12 and casing 13 in order to establish a fluid-tight relationship therebetween.

Within an inner space 18 which is defined in the output member 14, there is stored an adequate amount of viscous fluid such as silicon oil. The inner space 18 is divided into an operating chamber 20 and a storing chamber or reservoir 21 by a partition plate 19 in which a first passage 22 and a second passage 23 are formed in order that each passage can establish a respective fluid communication between the operating chamber 20 and the storing chamber 21. The first passage 22 and the second passage 23 are set to be opened and closed by a common valve member 24, and the rotation center thereof is secured with one end of a rod 25 which is rotatably mounted on the cover 12 via a bearing 26. The other end of the rod 25 is connected with a center end of a thermal responsive member 27 such as a spirally configurated bimetal. An outer periphery of the thermal responsive member 27 is secured to the cover 12. Thus, the valve member 24, the rod 25, and the thermal responsive member 27 constitute an opening and closing means 29.

Within the operating chamber 20, there is positioned a rotor 30 which is deemed to be a transmitting member which is connected to one end of the input member 11. The rotor 30 includes a penetrating hole 31, a transmitting mechanism 32, a pump means 33, and a by-pass means 34.

The penetrating hole 31 is set to penetrate the rotor 30 in the direction of its axial direction, and is set to be in alignment with the second passage 23. The transmitting mechanism 32 includes a labyrinth 32a which is formed between the left side of the rotor 30 and the right side of the partition plate 19, and a labyrinth 32b which is formed between the right side of the rotor 30 and the left side of the casing 13. The pump means 33 includes a pumping hole 33a which is formed at an outermost periphery of the partition plate 19, a pumping projection 33b which is formed integrally with the partition plate 19 so as to be positioned downstream of the pumping hole 33a in the direction of the rotating direction of the rotor 33, and a helical spline portion 33c which is formed at an outer periphery of the rotor 33.

Figure 2:
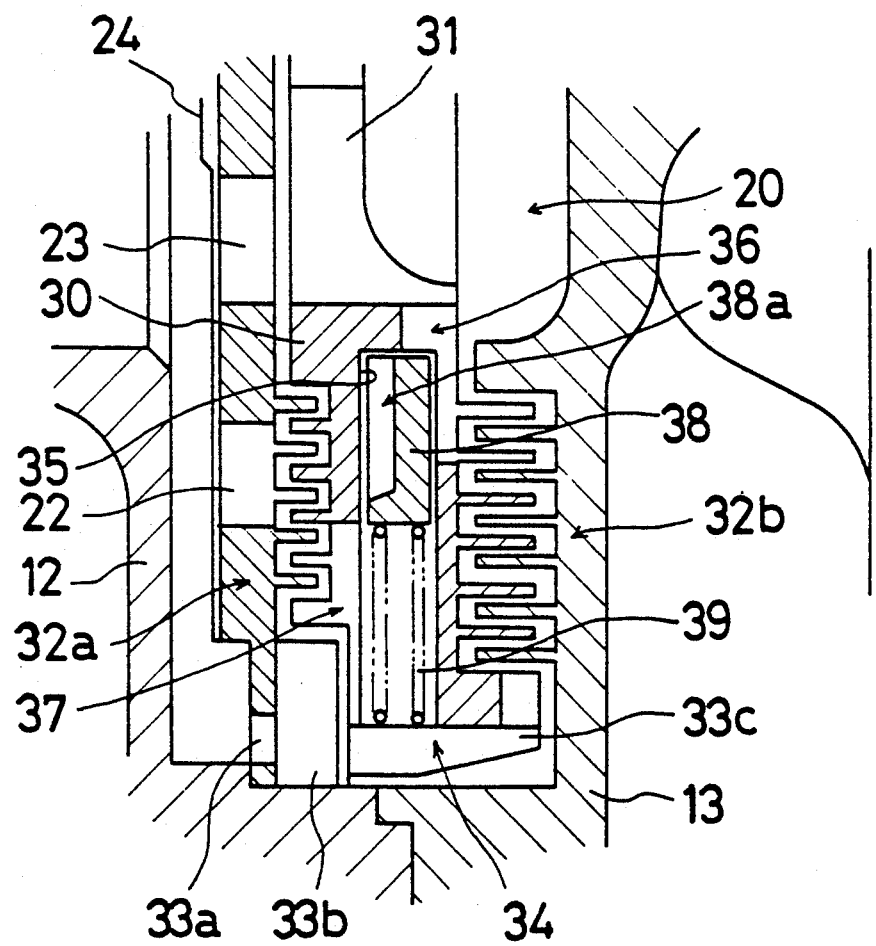
FIG. 2 is a cross-sectional view of a main portion of the device in FIG. 1 which is in a low rotational area.

The by-pass means 34 will be detailed with reference to FIG. 2. The rotor 35 is formed with a groove 30 which is set to extend in the radial direction of the rotor 30, a by-pass passage 36 for the establishment of a fluid communication between the groove 35 and the labyrinth 32b within the operating chamber 20, and a by-pass passage 37 for the establishment of a fluid communication between the groove 35 and the labyrinth 32a within the operating chamber 20. An opening and closing member 38 which is formed therein with a radially extended bypass passage 38a is so positioned in the groove 35 as to be moved therein. A spring 39 is set to apply pressure to the opening and closing member 38 in order that the member 38 may interrupt a fluid communication between the bypass passage 36 and the bypass passage 37.

The viscous fluid coupling device 10 to which the fan assembly is attached is positioned at a downstream side of a radiator (not shown) which is used, as well known, for dissipating the heat of the cooling water after the supply thereof to the vehicle engine operation.

Figure 5:
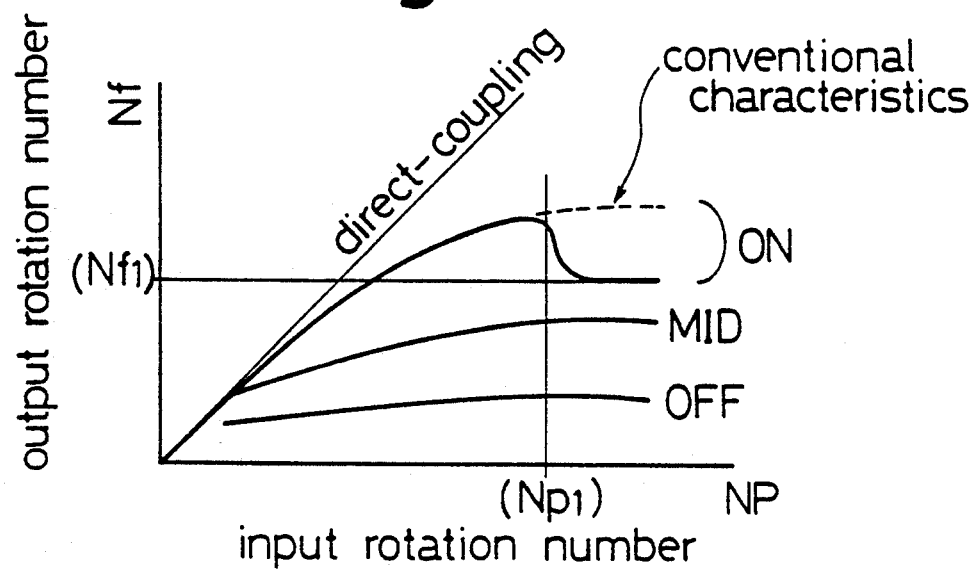
FIG. 5 is a characteristic graph.

The following is an operation of the viscous fluid coupling device 10 having the foregoing structure. Upon initiation of the engine, the input member 11 and the rotor 30 are rotated. Then, most of the viscous fluid in the operating chamber 20 is, due to the function of the pump means 33, supplied or returned to the storing chamber 21. At this time, the vehicle engine is not warmed up to a sufficient temperature and therefore the temperature of the cooling water is not so high. Thus, the temperature of air passing through the radiator remains at a low temperature, which results in that both of the first passage 22 and the second passage 23 are closed by the valve member 24 due to the actuation of the thermal sensitive member 27 which detects the current temperature of the foregoing air. However, since not all of the viscous fluid has left the operating chamber 20, the fan assembly attached to the output member 14 is rotated as a result of the transmission of the rotation of the input member 11 at a rotation number of Np to the output member 14 which establishes the rotation thereof at a rotational number of Nf in the "OFF" mode in FIG. 5.

As the vehicle engine is warmed gradually, the temperature of the cooling water is warmed in proportion thereto, which leads to an increase of the temperature of the passing air through the radiator is. Then, due to the actuation of the thermal sensitive member 27, the valve member 24 begins to open the first passage 22 only, which results in the supply of the viscous fluid from the storing chamber 21 to the first labyrinth 32a in the operating chamber 20 through the first passage 22. Thus, the rotation of the rotor 30 is transmitted to the partition plate 19 and the output member 14 via the viscous fluid remained in the labyrinth 32a. During this transmission, the relationship between a rotational number of Np of the input member 11 and a rotation number of Nf of the output member 14 can be seen as the "Mid" mode in FIG. 5. It is to be noted that the viscous fluid supplied to the labyrinth 32a is moved toward the outermost periphery of the operating chamber 20 as a result of centrifugal force, and is returned to the storing chamber 21 by the actuation of the pump means 33. That is to say, the viscous fluid is set to circulate through the storing chamber 21, the first passage 22, the labyrinth 32a, and the pump means 33.

Thereafter, when the temperature of the vehicle engine reaches a sufficient level, the temperature of the passing air through the radiator is also increased, which results in that the actuation of the thermal sensitive member 27 urges the valve member 24 to open the second passage 23 as well as the first passage 22. Then, the viscous fluid in the storing chamber 21 is supplied to the labyrinth 32a in the operating chamber 20 through the first passage 22, and is, in addition, supplied to the second labyrinth 32b in the operating chamber 20 through the second passage 23 and the penetrating hole 31. Thus, the rotation of the rotor 30 is transmitted to the output member 14 via the viscous fluid in both the labyrinth 32a and the labyrinth 32b. During this transmission, the relationship between a rotational number of Np of the input member 11 and a rotation number of Nf of the output member 14 can be seen as the "ON" mode in FIG. 5. Under this mode, the circulation of the viscous fluid similar to that under the "Mid" mode is established.

It is to be noted that when the vehicle engine rotates at a high speed, the travel speed of the vehicle, as a rule or in general, is also high. In light of the fact that the faster the vehicle runs, the more amount of wind is supplied to the radiator, the fan assembly attached to the output member 14 is not required to be rotated at a high speed. Thus, when an input rotation number Np of the input member 11 (the rotor 33) exceeds a value of Np1 in FIG. 5, the bypass means 34 is set to be initiated.

Figure 3:
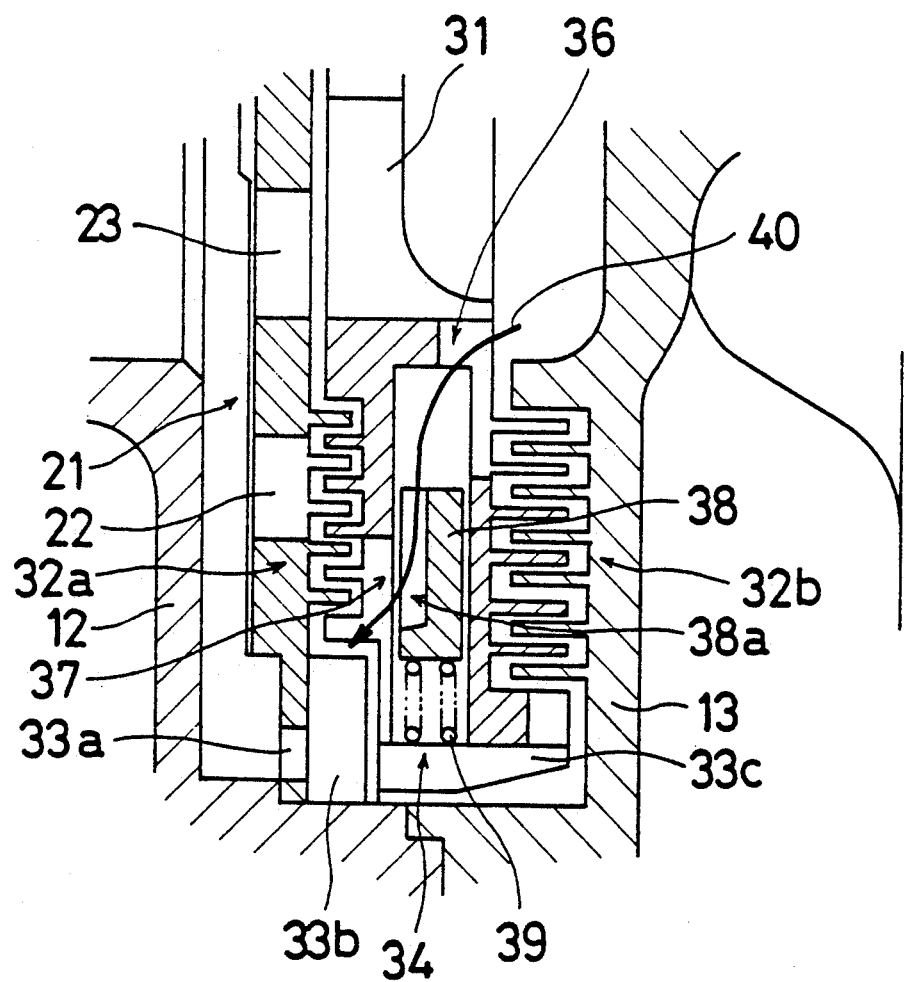
FIG. 3 is a cross-sectional view of a main portion of the device in FIG. 1 which is in a high rotational area; an exploded view of a seat shown in FIG. 1.

That is to say, the biasing or urging force of the spring 39 is so designed as to be larger than the centrifugal force which is to be applied to the opening and closing member 38 while the rotation number Np of the input member 11 (rotor 30) is less than Np1. When the rotation number Np of the input member 11 (rotor 30) exceeds the value of Np1, the spring 39 is compressed due to the centrifugal force applied to the opening and closing member 38 as shown in FIG. 3. At this time, most of viscous fluid supplied to the second labyrinth 22b in the operating chamber 20 through the penetrating hole 31 is fed or moved to the outermost periphery of the operating chamber 20 through the bypass passages 36, 38a, and 37, as indicated by an arrow 40, and is, in the long run, returned to the storing chamber 21 by the actuation of the pump means 33. The bypass means 14 enables the lowering or reducing of the rotational number of the input member 11 to about a value of Nf1 shown in FIG. 5.

Thereafter, if the rotational number of the input member 11 becomes a value less than the value of Nf1, the opening and closing member 38 return to interrupt the fluid communication between the bypass passage 36 and the bypass passage 38 again.

Figure 4:
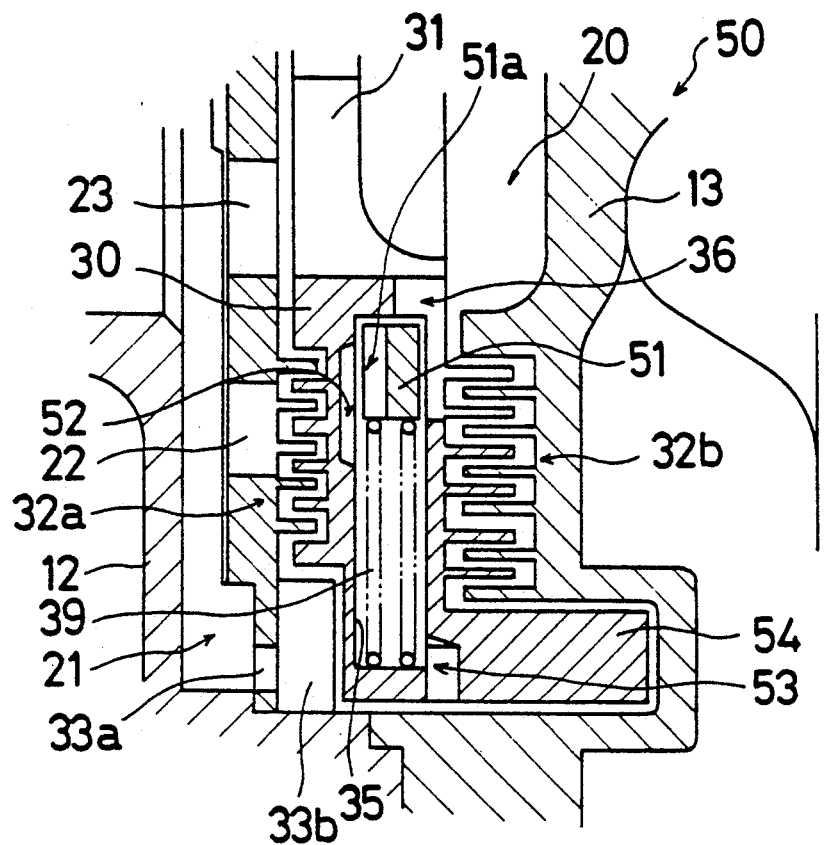
FIG. 4 is a cross-sectional view of a main portion of another embodiment of a viscous fluid coupling device according to the present invention.

FIG. 4 illustrates another embodiment a viscous fluid coupling according to the present invention. In the following description, only portions of the embodiment which differ from those of the foregoing embodiment will be described.

A rotor 30 is provided therein with a radial groove or slot 35 in which an opening and closing member 51 having a radially oriented bypass passage 51a is slidably fitted. The opening and closing member 51 is biased by a spring 39 outwardly in the radial direction. In addition to the groove 35, the rotor 30 is formed with bypass passages 52 and 53. The rotor 30 also includes a flange 54 to which the labyrinth can be extended. A helical spline portion, though it is not provided in this embodiment, can be provided therein similar to the foregoing embodiment. When a rotation number Np of the input member 11 (rotor 30) exceeds a value of Np1, the opening and closing member 51 is moved downwardly against the biasing force of the spring 39, which results in that the bypass passage 36 is brought into fluid communication with the bypass passage 53 via the bypass passage 51a, the bypass passage 52, and the groove 35.

As mentioned above, according to the present invention. during the rotation of the input member at a high speed, the supply of the viscous fluid to the transmitting means is restricted by the actuation of the bypass means, and the surplus viscous fluid is returned to the storing chamber after the direct supply to the pump means. Thus, unnecessary torque transmission is restricted from the input member to the output member.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A viscous fluid coupling device comprising:
an input member;
a rotor secured to the input member;
an output member having therein an inner space and mounted rotatably on the input member;
a partition plate, for dividing the inner space into an operating chamber and a reservoir chamber for storing therein an amount of viscous fluid, secured to the output member and having a passage for establishing a fluid communication therebetween;
a thermal response valve, for opening and closing the passage, provided on the output member;
a labyrinth, for transmitting the rotation torque from the input member to the output member via the viscous fluid, provided therebetween so as to be positioned in the operating chamber;
pump means, for returning the viscous fluid to the reservoir chamber, formed between an outer periphery of the rotor and an inner surface of the output member; and
bypass means, for the direct supply of the viscous fluid from the operating chamber to the pump means upon high speed rotation of input member, positioned in the rotor in parallel with the labyrinth,
wherein the bypass means has a radial slot formed in the rotor, an opening and closing member disposed slidably in the slot, and a spring urging the opening and closing member inwardly in the radial direction, and
wherein the opening and closing member is provided with a groove passage in a surface of said opening and closing member facing the reservoir chamber.

2. A viscous fluid coupling device comprising:
an input member;
a rotor secured to the input member;
an output member having therein an inner space and mounted rotatably on the input member;
a partition plate, for dividing the inner space into an operating chamber and a reservoir chamber for storing therein an amount of viscous fluid, secured to the output member and having a first passage and a second passage each of which is designed for establishing a fluid communication between the reservoir chamber and the operating chamber;
a thermal response valve, for opening and closing the first passage or the first passage and the second passage, provided on the output member;
a first labyrinth, for transmitting the rotation torque from the input member to the output member via the viscous fluid passed from the second passage, provided between one surface of the rotor and the partition plate so as to be positioned in the operating chamber;
a second labyrinth, for transmitting the rotation torque from the input member to the output member via the viscous fluid passed from the first passage, provided between the other surface of the rotor and the output member so as to be positioned in the operating chamber;
pump means, for returning the viscous fluid to the reservoir chamber, formed between an outer periphery of the rotor and an inner surface of the output member; and
bypass means, for the direct supply of the viscous fluid supplied from the reservoir chamber to the pump means upon high speed rotation of the input member, positioned in the rotor in parallel with both of the first labyrinth and the second labyrinth,
wherein the bypass means has a radial slot formed in the rotor so as to be located between the first labyrinth and the second labyrinth, an opening and closing member disposed slidably in the slot, and a spring during the opening and closing member inwardly in the radial direction, and
wherein a surface of the opening and closing member is provided with a groove passage facing the second labyrinth.

* * * * *